United States Patent
Song et al.

(10) Patent No.: US 7,248,654 B2
(45) Date of Patent: Jul. 24, 2007

(54) APPARATUS AND METHOD FOR COMPENSATING I/Q IMBALANCE BASED ON GAIN-CONTROLLED REFERENCE CHANNEL IN ORTHOGONAL FREQUENCY DIVISION MULTIPLEX

(75) Inventors: Yun-Jeong Song, Daejon (KR); Young-Wan Kim, Daejon (KR); Ho-Jin Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 490 days.

(21) Appl. No.: 10/856,052

(22) Filed: May 27, 2004

(65) Prior Publication Data

US 2005/0078776 A1 Apr. 14, 2005

(30) Foreign Application Priority Data

Oct. 9, 2003 (KR) .................... 10-2003-0070391

(51) Int. Cl.
*H04L 27/08* (2006.01)
(52) U.S. Cl. .................................................. 375/345
(58) Field of Classification Search ................ 375/316, 375/345, 329, 340, 261, 279, 280; 455/232.1–235
See application file for complete search history.

(56) References Cited

U.S. PATENT DOCUMENTS

| 5,949,821 | A | 9/1999 | Emami et al. |
| 6,044,112 | A | 3/2000 | Koslov |
| 6,122,325 | A | 9/2000 | Mogre et al. |
| 6,925,132 | B2 * | 8/2005 | Song et al. .................. 375/316 |
| 7,010,059 | B2 * | 3/2006 | Song et al. .................. 375/316 |
| 7,130,359 | B2 * | 10/2006 | Rahman ..................... 375/316 |

OTHER PUBLICATIONS

IEICE Trans. Commun., vol.E83-B, No. 1, Jan. 2000, pp. 99-102.
Digital Filter Equalization of Analog Gain and Phase Mismatch in I-Q Receivers, pp. 793-796.
A Joint Scheme for AGC and I/Q Imbalance Compensation at QPSK Receiver, 4 pages.

* cited by examiner

*Primary Examiner*—Tesfaldet Bocure
(74) *Attorney, Agent, or Firm*—Blakely Sokoloff Taylor & Zafman

(57) ABSTRACT

An apparatus and a method for controlling a gain of I-channel signal and compensating Q-channel signal in response to the gain imbalance based on the gain-controlled I-channel signal as a reference channel signal is disclosed. The apparatus includes: an auto gain controller for controlling a gain of a signal selected from the I-channel signal and the Q-channel signal to have a predetermined amplitude, thereby generating a gain-controlled signal; a detector for detecting a gain imbalance between the gain-controlled signal and the remaining channel signal; and a compensator for compensating the gain imbalance of the remaining channel signal based on the detected gain imbalance.

9 Claims, 5 Drawing Sheets

APPARATUS AND METHOD FOR COMPENSATING I/Q IMBALANCE BASED ON GAIN-CONTROLLED REFERENCE CHANNEL IN ORTHOGONAL FREQUENCY DIVISION MULTIPLEX

FIELD OF THE INVENTION

The present invention relates to a communication system; and more particularly, to an apparatus and a method for compensating a gain imbalance between a Q-channel signal and an I-channel signal by using an auto gain controller.

DESCRIPTION OF RELATED ARTS

In a high-speed wireless communication system, a receiver receives a signal modulated based on a predetermined modulation mode such as Quadrature phase shift keying (QPSK) or Quadrature Amplitude Modulation (QAM) from a transmitter. The receiver demodulates the modulated signal for restoring an original signal and amplifies the demodulated signal by automatic gain control (AGC) since the strength of modulated signal is reduced by traveling through an air between the transmitter and receiver. For demodulating the modulated signal, a number of analog radio frequency (RF) and intermediate frequency (IF) components such as a multiplier and amplifier are used. However, the analogue components may cause signal distortion from an imperfections in analog circuitry, multiplier's isolation, stray capacitance and signal routings.

One of factors to cause a signal distortion is a gain and a phase imbalances between a Q-channel signal and an I-channel signal. The phase and the gain imbalances are generated since the phases of the I-channel signal and the Q-channel signal are not perfectly orthogonal at signal generation in the analog components. The phase and the gain imbalances are one of factors to degrade a performance of the orthogonal frequency division multiplexer (OFDM) in a MODEM for restoration of signal. Accordingly, various methods for compensating the phase and the gain imbalances of I/Q channels have been introduced.

FIG. 1 is a diagram showing a compensator for compensating a phase and a gain imbalances between an I-channel signal and a Q-channel signal in accordance with a prior art.

The compensator of the prior art detects a phase and a gain imbalances and compensates the Q-channel signal based on the I-channel signal as a reference channel in response to the detected phase and gain imbalances. After compensating, the I-channel signal and the imbalance-compensated Q-channel signal are controlled to have a desired amplitude by an automatic gain controller.

Referring to FIG. 1, the compensator 100 of prior art includes a phase imbalance detector 101, a phase compensator 102, a gain imbalance detector 103, a gain compensator 104 and an auto gain controller (AGC) 105.

The phase imbalance detector 101 receives an I-channel signal I(k) and a Q-channel signal Q(k) and detects a phase imbalance between the I-channel signal I(k) and the Q-channel signal Q(k), wherein k is a positive integer representing the sequence of the signals.

The phase compensator 102 compensates the Q-channel signal Q(k) in response to the detected phase imbalance to generates a phase-compensated Q channel signal Q'(k).

The gain imbalance detector 103 detects a gain imbalance between the I-channel signal I(k) and the phase-compensated Q channel signal Q'(k).

The gain compensator 104 compensates the phase-compensated Q channel signal Q'(k) in response to the gain imbalance detected to generate the imbalance-compensated Q channel signal Q''(k).

The auto gain controller 105 receives the I-channel signal I(k) and the imbalance-compensated Q channel signal Q''(k), and generates a gain controlled I-channel signal I'(k) and a gain controlled Q-channel signal Q'''(k) by determining a gain amount and amplifying the I-channel signal I(k) and the imbalance-compensated Q-channel signal Q''(k) to have a desired amplitude.

As shown in FIG. 1, the automatic gain controller 105, the gain detector 103 and gain compensator 104 are implemented as separates devices in the demodulator. Therefore, integration of the demodulator is decreased.

Furthermore, the auto gain controller 105 performs gain control operation after compensating the phase and the gain imbalances. Therefore, it may amplify the gain imbalance of the I-channel signal I(k) and the imbalance-compensated Q-channel signal Q''(k) if the gain imbalance is still existed between the I-channel signal I(k) and the imbalance-compensated Q-channel signal Q''(k).

SUMMARY OF THE INVENTION

It is, therefore, an object of the present invention to provide an apparatus and a method for controlling a gain of an I-channel signal, detecting a gain imbalance between a gain-controlled I-channel signal and a Q-channel signal, and compensating the Q-channel signal in response to the gain imbalance based on the gain-controlled I-channel signal as a reference channel signal.

In accordance with an aspect of the present invention, there is provided an apparatus for compensating a gain imbalance between an I-channel signal and a Q-channel signal, the apparatus including: an auto gain controller for controlling a gain of a signal selected from the I-channel signal and the Q-channel signal to have a predetermined amplitude, thereby generating a gain-controlled signal; a detector for detecting a gain imbalance between the gain-controlled signal and the remaining channel signal; and a compensator for compensating the gain imbalance of the remaining channel signal based on the detected gain imbalance.

In accordance with an aspect of the present invention, there is also provided a method for compensating a gain imbalance between an I-channel signal and a Q-channel signal, the method including the steps of: a) controlling a gain of a signal selected from the I-channel signal and the Q-channel signal to have a predetermined amplitude, thereby generating a gain-controlled signal; b) detecting a gain imbalance between the gain-controlled signal and the remaining channel signal; and c) compensating the gain imbalance of the remaining channel signal based on the detected gain imbalance.

In accordance with another aspect of the present invention, there is also provided a computer readable recording medium for storing instructions for executing a method for compensating a gain imbalance between an I-channel signal and a Q-channel signal, the method including the steps of: a) controlling a gain of a signal selected from the I-channel signal and the Q-channel signal to have a predetermined amplitude, thereby generating a gain-controlled signal; b) detecting a gain imbalance between the gain-controlled signal and the remaining channel signal; and c) compensating the gain imbalance of the remaining channel signal based on the detected gain imbalance.

BRIEF DESCRIPTION OF THE DRAWINGS

The above and other objects and features of the present invention will become better understood with regard to the following description of the preferred embodiments given in conjunction with the accompanying drawings, in which:

FIGS. 4A and 4D are constellations of an I-channel signal and a Q-channel signal showing a phase imbalance there between;

DETAILED DESCRIPTION OF THE INVENTION

Hereinafter, an apparatus and a method for compensating a gain imbalance between a Q-channel signal and an I-channel signal by using an automatic gain controller in accordance with a preferred embodiment of the present invention will be described in detail with reference to the accompanying drawings.

Figure 1:
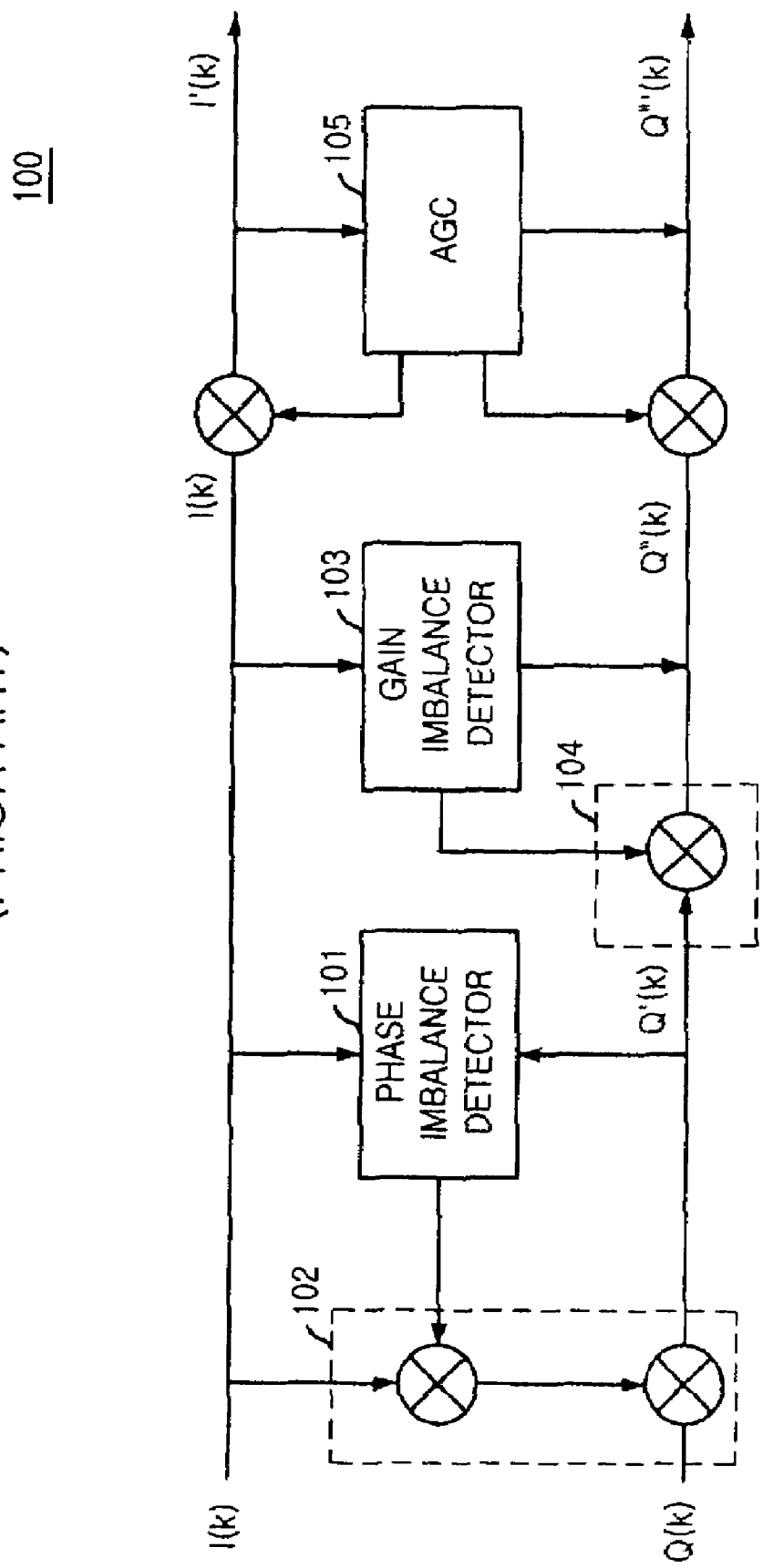
FIG. 1 is a diagram showing a compensator for compensating a phase and a gain imbalances between an I-channel signal and a Q-channel signal in accordance with a prior art.
Figure 2:
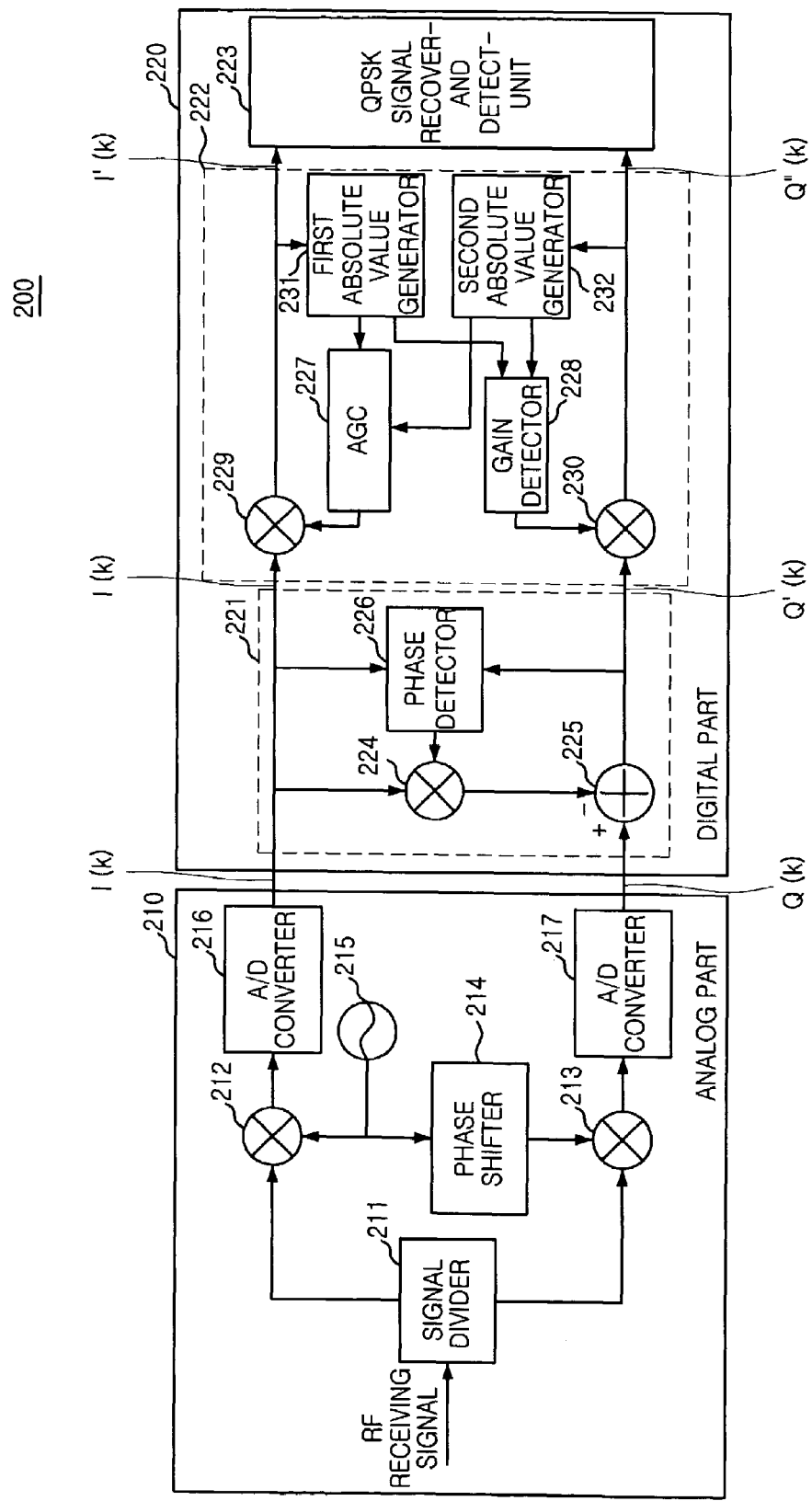
FIG. 2 is a diagram showing an orthogonal frequency division multiplexer (OFDM) in accordance with a preferred embodiment of the present invention.

FIG. 2 is a diagram showing an orthogonal frequency division multiplexer (OFDM) in accordance with a preferred embodiment of the present invention.

As shown in FIG. 2, the OFDM 200 includes an analog part 210 provided with a signal divider 211, a first multiplier 212, a second multiplier 213, a phase shifter 214, a carrier signal generator 215, a first A/D converter 216 and a second A/D converter 217 and a digital part 220 for compensating a phase and a gain imbalances between an I-channel signal I(k) and a Q-channel signal Q(k).

The signal divider 211 receives a radio frequency (RF) signal and divides the RF signal into a first and a second portions. The first portion of the RF signal is transmitted to the first multiplier 212, whereas the second portion of the RF signal is transmitted to the second multiplier 213.

The first multiplier 212 generates an analog I-channel signal by mixing the first portion of the RF signal with a carrier signal outputted from the carrier signal generator 215. The second multiplier 213 generates an analog Q-channel signal by mixing the second portion of the RF signal with a 90 degree phase shifted carrier signal generated by the phase shifter 214.

The first and the second A/D converters 216, 217 convert the analog I-channel and the analog Q-channel signals into a digital I-channel signal I(k) and a digital Q-channel signal Q(k), respectively, wherein k is a positive integer representing the sequence of the signals.

Although the preferred embodiment of the present invention is described with no low pass filter included, it is possible that a plurality of filters such as low pass filters be included in front of the first and the second A/D converters 216 and 217 or in front of the first and the second multipliers 212 and 213.

As mentioned above, the analog part 210 generates the gain and the phase imbalances of the RF signal since the multipliers and A/D converters are never perfectly balanced.

A signal r(k), which represents the sum of an I-channel signal and a Q-channel signal outputted from the first and the second A/D converters 216 and 217, is expressed as following equation Eq. 1.

$$r(k)=A(I(k)+j(\gamma I(k)\sin \Phi + \gamma Q(k)\cos \Phi) +w_I(k)+w_Q(k)) \quad \text{Eq. 1}$$

Wherein, r(k) represent a signal including the I-channel signal I(k) and Q-channel signal Q(k) generated after passing through the analog part 210, $w_I(k)$ is a noise of I-channel signal, $w_Q(k)$ is a noise of Q-channel signal, $\gamma$ is a gain imbalance factor, $\Phi$ is a phase imbalance factor and A represents an amplitude of inputted signal.

As shown in Eq. 1, the gain imbalance factor $\gamma$ of Q-channel signal is a value related with the I-channel signal and the phase imbalance factor $\Phi$ is a value of a cosine or a sine which represents a phase difference between the Q-channel signal and the I-channel signal.

Accordingly, the phase and the gain imbalances between the I-channel signal and the Q-channel signal must be compensated.

The digital part 220 includes a phase compensator 221, a gain compensator 222 and a quadrature phase shift keying (QPSK) signal recover and detect unit 223.

The digital part 220 compensates a phase imbalance between the I-channel signal I(k) and the Q-channel signal Q(k) based on the I-channel signal as a reference signal, controls a gain of the I-channel signal I(k) and compensates a phase-compensated Q-channel signal Q'(k) based on a gain-controlled I-channel signal I'(k) as a reference signal.

The phase compensator 221 includes a phase detector 226, a third multiplier 224 and an adder 225. The phase compensator 221 receives the I-channel signal I(k) and the Q-channel signal Q(k) and detects a phase imbalance between the I-channel signal I(k) and the Q-channel signal Q(k) at the phase detector 226. The third multiplier 224 multiplies the detected phase imbalance by the I-channel signal I(k) to generate a multiplied signal. The adder 225 adds the minus value of the multiplied signal and the Q-channel signal, thereby generating a phase-compensated Q-channel signal Q'(k).

The gain compensator 222 includes an automatic gain controller 227, a gain detector 228, a first absolute value generator 231, a second absolute value generator 232, a fourth and a fifth multipliers 229, 230. The first absolute value generator 231 generates an absolute value of the I-channel signal I(k). The second absolute value generator 232 generates an absolute value of the Q-channel signal Q'(k). The gain compensator 222 controls a gain of the I-channel signal I(k) to have a desired amplitude in order to generate a gain-controlled I-channel signal I'(k) by using the auto gain controller 227. The gain detector 228 detects a gain imbalance between the gain-controlled I-channel signal I'(k) and the phase-compensated Q-channel signal Q'(k) and compensates the phase compensated Q-channel signal Q'(k) in response to the detected gain imbalance based on the gain-controlled I-channel signal I'(k) to generate an imbalance-compensated Q-channel signal Q"(k).

The QPSK recover and detect unit 223 restores an original signal from the gain-controlled I-channel signal I'(k) and the imbalance-compensated Q-channel signal Q"(k).

Figure 3:
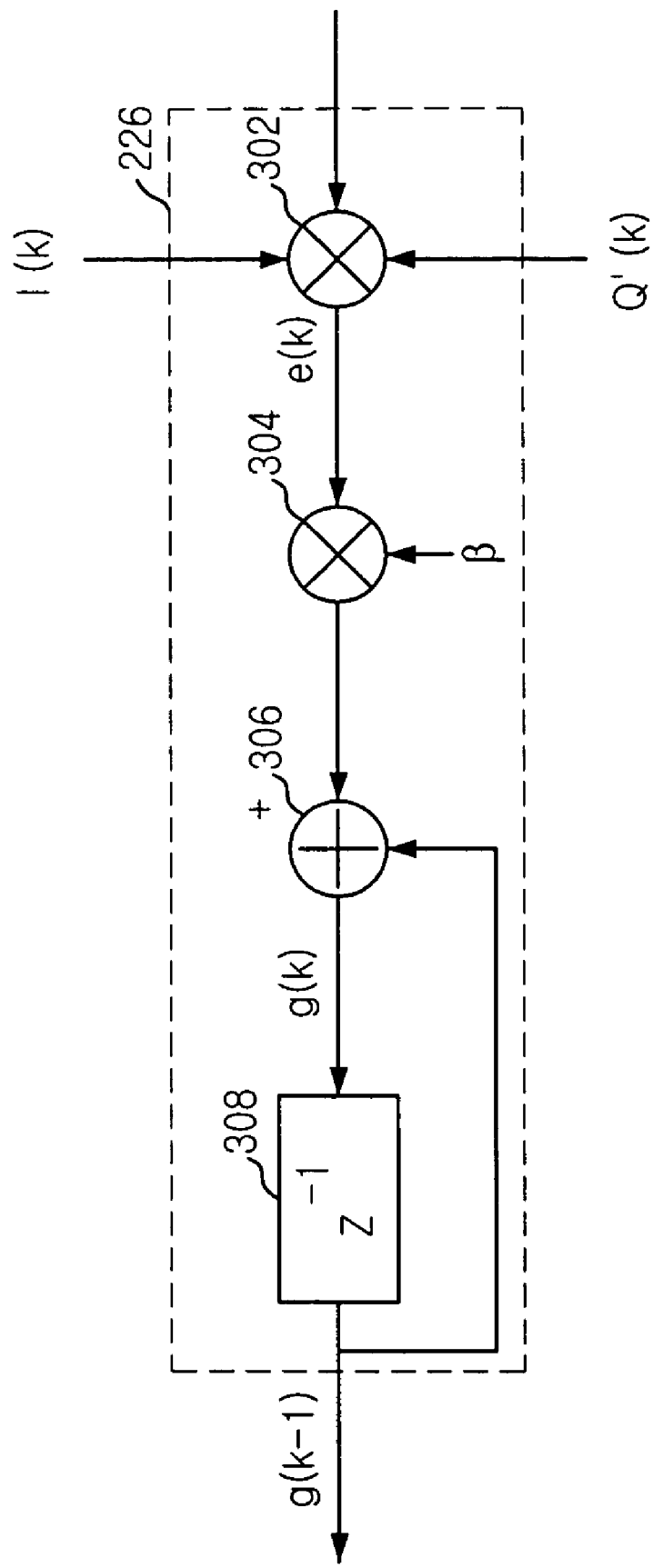
FIG. 3 is a detailed diagram showing the phase detector of FIG. 2.

FIG. 3 is a detailed diagram showing the phase detector of FIG. 2.

As shown, the phase detector 226 includes an error multiplier 302, a gain multiplier 304, a loop gain adder 306 and a loop gain delay 308.

The error multiplier 302 multiplies the I-channel signal I(k) by the Q-channel signal Q'(k) to generate an error signal e(k) representing a phase difference between the I-channel signal I(k) and the Q-channel signal Q'(k). The gain multiplier 304 multiplies the error signal e(k) by a loop gain value β to generate a loop gained error signal. The loop gain adder 306 and the loop gain delay 308 are formed as a balancing loop and co-operated as an integrator. The loop gain adder 306 adds a loop gained error signal and a phase imbalance g(k−1) of previous signal sequence (k−1) to generate a phase imbalance g(k) of current signal sequence (k). The loop gain delay 308 delays the phase imbalance g(k) of current signal sequence (k) for compensating a Q-channel signal Q'(k+1) of next signal sequence (k+1). Therefore, the loop gain delay 308 outputs the phase imbalance g(k−1) of previous signal sequence (k−1) for compensating the Q-channel signal Q'(k) of current signal sequence (k).

Figure 4A:
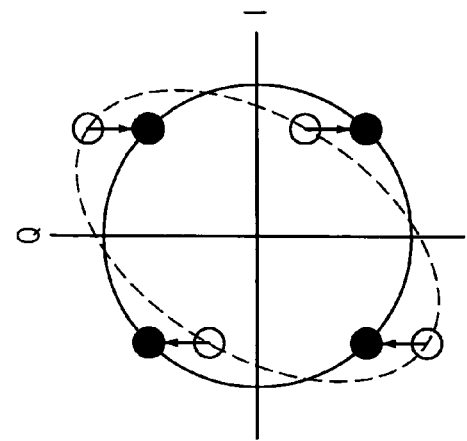
Figure 4B:
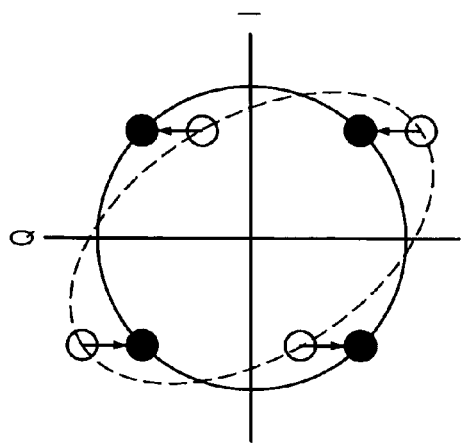
Figure 4C:
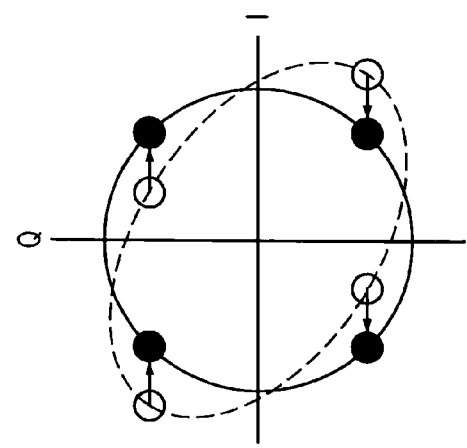
Figure 4D:
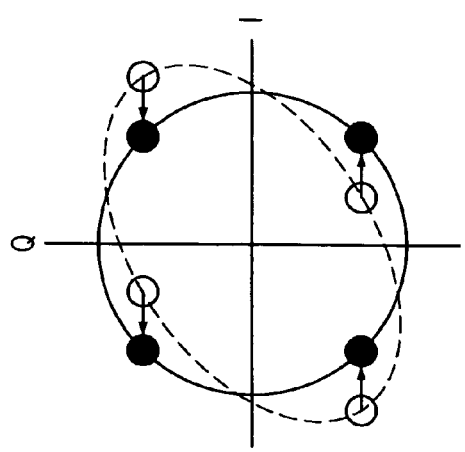

FIGS. 4A and 4D are constellations of an I-channel signal and a Q-channel signal showing a phase imbalance there between.

FIGS. 4A and 4B show diagrams illustrating that the phase imbalance of Q-channel Q(k) is compensated based on the I-channel signal I(k) as a reference channel and FIGS. 4C and 4D show diagrams illustrating that the phase imbalance of I-channel signal I(k) is compensated based on the Q-channel signal Q(k) as a reference channel. A solid line and four block dots ● represent a desired position of restored signal and a dotted line and four white dots ○ represent a position of restored signal caused by the phase imbalance between the I-channel signal I(k) and Q-channel signal Q(k).

Referring to FIGS. 4A and 4D, there is a certain type of distortion in constellations which is caused by the phase imbalance.

Figure 5:
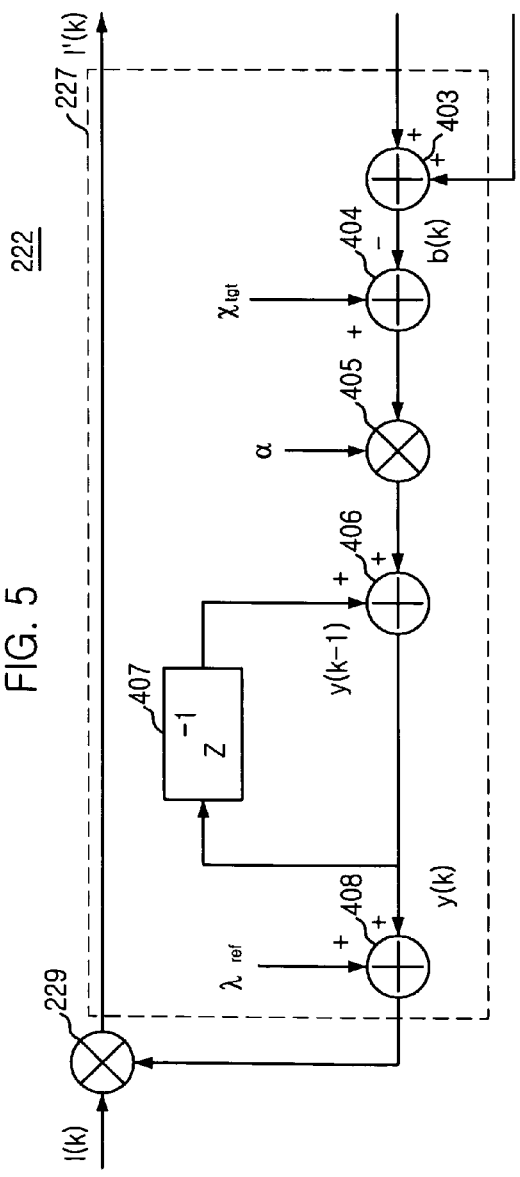
FIG. 5 is a detailed diagram of the AGC of FIG. 2 in accordance with a preferred embodiment of the present invention.

FIG. 5 is a detailed diagram of the AGC of FIG. 2 in accordance with a preferred embodiment of the present invention.

The AGC 227 controls a gain of I-channel signal I(k) to have a desired amplitude and compensates a phase-compensated Q-channel signal Q'(k) by eliminating a gain imbalance between a gain-controlled I-channel I'(k) and the phase-compensated Q-channel Q'(k) based on the gain-controlled I-channel signal I'(k) as a reference channel signal. And, the gain compensator 222 controls the gain of the phase-compensated Q-channel signal Q'(k) by using the absolute values of the I-channel signal and the Q-channel signal detected during the detection of the gain imbalance.

Conventionally, an AGC 227 and a gain compensator 222 for compensating an I/Q channel imbalance are implemented as two separated devices and control amplitudes of the I-channel and the Q-channel to have desired amplitude. However, in the preferred embodiment of the present invention, the AGC 227 and the gain compensator 222 for compensating the I/Q channel gain imbalance are combined as one device. The present invention controls the gain of I-channel signal I(k) by using the AGC 227 to have a desired level of amplitude and sets the gain-controlled I-channel signal I'(k) as a reference channel. Based on the reference channel, the gain imbalance of the phase-compensated Q-channel Q'(k) is compensated.

In accordance with a preferred embodiment of the present invention, the AGC 227 includes a second adder 408, a third adder 406, a delay 407, a sixth multiplier 405, a fourth adder 404 and a fifth adder 403.

When k is 0, the third multiplier 229 passes an I-channel signal I(0) of $0^{th}$ signal sequence to the first absolute value generator 231 and the fifth multiplier 230 also passes through an phase compensated Q-channel signal Q'(0) of $0^{th}$ signal sequence.

At k signal sequence, the fifth adder 403 receives the absolute value of the I-channel signal I'(k) from the first absolute value generator 231 and the absolute value of the phase-compensated Q-channel signal Q''(k) from the second absolute value generator 232 to calculate the sum b(k) of the absolute value of the I-channel signal I'(k) and the phase-compensated Q-channel signal Q''(k).

The sum b(k) of the absolute value of the I-channel signal (k) and the phase-compensated Q-channel signal Q'(k) is expressed as:

$$b(k) = |AI(k)| + |A\gamma Q(k) \cos \Phi| \quad \text{Eq. 2}$$

And then, the fourth adder 404 subtracts the sum b(k) from the desired value.

If a target gain $X_{tgt}$ of loop is equal to a desired value in steady state, the target gain is expressed as:

$$X_{tgt} = (|AI(k)| + |A\gamma Q(k)\cos\Phi|)(Q_{reg} + \lambda_{ref}) \quad \text{Eq. 3}$$

$$Q_{reg} = \frac{X_{tgt}}{|AI(k)| + |A\gamma Q(k)\cos\Phi|} - \lambda_{ref} \quad \text{Eq. 4}$$

In Eq. 4, $Q_{reg}$ is a value of delay 407 of the auto gain control loop for steady state, $\lambda_{ref}$ is an initial value for preventing an output of the third multiplier from becoming null by setting it a constant value.

At the sixth multiplier 405, the subtracted value from the fourth adder 404 is multiplied by an AGC gain α. To find an auto gain control loop characteristic, a value of the delay 407, y(k), is represented as:

$$\begin{aligned}y(k) &= y(k-1) + \alpha p(k) \\ &= y(k-1) + \alpha(X_{tgt} - (|AI(k)| + \\ &\quad |A\gamma Q(k)\cos\Phi|)(y(k-1) - \lambda_{ref})) \\ &= (1 - \alpha(AI(k) + (A\gamma Q(k)\cos\Phi|)y(k-1) + \\ &\quad \alpha(X_{tgt} - (|AI(k)| + |A\gamma Q(k)\cos\Phi|)\lambda_{ref})\end{aligned} \quad \text{Eq. 5}$$

Wherein, α is a variable for controlling the bandwidth of noise within the AGC loop and the acquisition speed. In the steady state, the value of delay 407 becomes:

$$y(k) = \frac{Xtgt}{|AI(k)| + |A\gamma Q(k)\cos\Phi|} - \lambda_{ref} \quad \text{Eq. 6}$$

Consequently, y(k) of Eq. 6 becomes identical to $Q_{reg}$ of Eq. 4. In other words, the I-channel signal is controlled to have the target gain by the AGC.

In the state in front of the QPSK signal recover and detect unit 233, a gain-controlled I-channel signal I'(k) is expressed as:

$$I' = |AI(k)|S\left(\frac{X_{tgt}}{|AI(k)| + |A\gamma Q(k)\cos\Phi|} - \lambda_{ref}\right) \quad \text{Eq. 7}$$

Hereinafter, a gain imbalance compensation between the gain-controlled I-channel signal I'(k) and the phase compensated Q-channel signal Q"(k) is explained with mathematical concepts.

Figure 6:
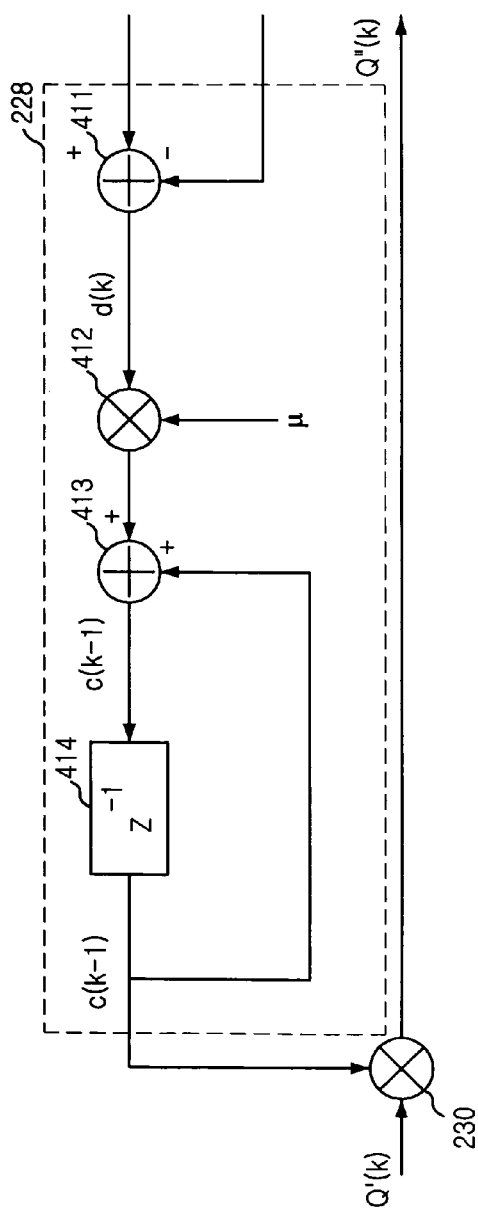
FIG. 6 is a detailed diagram showing a gain detector in FIG. 2 in accordance with a preferred embodiment of the present invention.

FIG. 6 is a detailed diagram showing a gain detector in FIG. 2 in accordance with a preferred embodiment of the present invention.

The gain detector 228 detects a gain imbalance between the gain-controlled I-channel signal I'(k) and a phase-compensated Q-channel signal Q'(k) and the fifth multiplier 230 compensates the phase-compensated Q-channel signal Q'(k) in response to the detected gain imbalance based on the gain-controlled I-channel signal I'(k) as a reference channel to thereby generate an imbalance-compensated Q-channel signal Q"(k).

As shown in FIG. 6, the gain detector 228 includes a sixth adder 411, a seventh multiplier 412, a seventh adder 413 and a gain loop delay 414.

When k is 0, the fifth multiplier 230 passes through a phase-compensated Q-channel signal Q'(0) to the second absolute value generator 232. And, the gain detector 228 detects a gain imbalance between the I-channel signal I(0) and the phase-compensated Q-channel signal Q'(0).

When k is 1, the gain detector 228 detects a gain imbalance between the gain-controlled I-channel signal I'(1) and the phase-compensated Q-channel signal Q'(1).

At k signal sequence, the sixth adder 411 receives the absolute value of the gain-controlled I-channel signal I'(k) from the first absolute value generator 231 and the absolute value of the phase-compensated Q-channel signal Q'(k) from the second absolute value generator 232 to calculate a difference between the gain-controlled I-channel signal I'(k) and the phase compensated Q-channel signal Q'(k) to generate an error signal d(k). The d(k) is expressed as:

$$d(k) = \left[|AI(k)| \times \left[\frac{X_{tgt}}{|AI(k)| + |A\gamma Q(k)\cos\Phi|} - \lambda_{ref}\right] - |Q'(k)|\right] \quad \text{Eq. 8}$$

The seventh multiplier 412 multiplies the d(k) and a loop gain value μ for quickly stabilizing an adaptive loop to generate a loop gained error signal.

The seventh adder 413 generates a gain imbalance c(k) of a current signal sequence k by adding the loop gained error signal and a gain imbalance c(k−1) of previous signal sequence k−1 which is delayed in the gain loop delay 414.

The gain imbalance c(k) is expressed as:

$$c(k) = c(k-1) + \mu d(k) \quad \text{Eq. 9}$$
$$= (1 - \mu|\gamma AQ(k)\cos\Phi|)c(k-1) +$$
$$\mu\left[|AI(k)| \times \left[\frac{X_{tgt}}{|AI(k)| + |\gamma AQ(k)\cos\Phi|} - \lambda_{ref}\right]\right]$$

When the gain loop is stabilized, the gain imbalance c(k) is expressed as:

$$c(k) = \frac{X_{tgt}}{(|AI(k)| + |AQ(k)\gamma\cos\Phi|)\gamma\cos\Phi} - \frac{\lambda_{ref}}{\gamma\cos\Phi} \quad \text{Eq. 10}$$

The fifth multiplier 230 compensates the phase compensated Q-channel signal Q'(k) by multiplying the phase compensated Q-channel signal Q'(k) and the gain imbalance c(k) to thereby generate the imbalance compensated Q-channel signal Q"(k) based on the gain-controlled I-channel signal I'(k). The imbalance compensated Q-channel signal Q"(k) is expressed as:

$$Q''(k) = Q'(k)c(k) \quad \text{Eq. 11}$$

As mentioned above, the present invention controls the I-channel signal I(k) to have desired amplitude and compensates the phase-compensated Q-channel signal Q'(k) based on the gain-controlled I-channel signal I'(k) as a reference channel by using the auto gain control and gain compensator which is implemented as one combined device.

In the above mentioned preferred embodiment of the present invention, the I channel signal I(k) is used as a reference channel, however, the Q-channel signal Q(k) can be used as a reference channel to be auto-gain controlled and the I-channel signal I(k) can be compensated based on a gain-controlled Q-channel signal Q'(k) as a reference signal.

The present invention improves utilization of high speed communication system by implementing an auto gain controller and a gain compensator as one simple device.

Also, the present invention can control a gain of I/Q channels with simple configuration device by detecting a gain imbalance based on absolute values of an I-channel signal and a Q-channel signal.

Furthermore, the present invention can quickly control gains of an I-channel signal and a Q-channel signal by compensating a gain imbalance based on a gain-controlled I-channel signal as a reference channel.

The present application contains subject matter related to Korean patent application No. KR 2003-0070391 filed in the Korean patent office on Oct. 9, 2003, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An apparatus for compensating a gain imbalance between an I-channel signal and a Q-channel signal, the apparatus comprising:

a gain controlling means for controlling a gain of a signal selected from the I-channel signal and the Q-channel signal to have a predetermined amplitude, thereby generating a gain-controlled signal;

a gain imbalance detection means for detecting a gain imbalance between the gain-controlled signal and the remaining channel signal; and a gain imbalance compensating means for compensating the gain imbalance of the remaining channel signal based on the detected gain imbalance, wherein the gain controlling means controls a gain of a selected channel signal until a sum of absolute value of the selected channel signal and a remaining channel signal is equal to a predetermined gain value by using an auto gain control loop.

2. The apparatus of claim 1, wherein the gain imbalance detecting means detects the gain imbalance by calculating a difference value between an absolute value of the gain-controlled signal and an absolute value of the remaining channel signal, and multiplying the difference value and a loop gain to generate the gain imbalance.

3. The apparatus of claim 1, wherein the compensating means compensates the remaining channel signal based on the gain-controlled signal by multiplying the detected imbalance gain by the remaining channel signal.

4. The apparatus of claim 1, wherein the selected channel signal is an I-channel signal and the remaining channel signal is an Q-channel signal.

5. A method for compensating a gain imbalance between an I-channel signal and a Q-channel signal, the method comprising the steps of:
   a) controlling a gain of a signal selected from the I-channel signal and the Q-channel signal to have a predetermined amplitude, and to generate a gain-controlled signal, wherein a gain of a selected channel signal is controlled until a sum of absolute value of the selected channel signal and a remaining channel signal is equal to a predetermined gain value by using an auto gain control loop;
   b) detecting a gain imbalance between the gain-controlled signal and the remaining channel signal; and
   c) compensating the gain imbalance of the remaining channel signal based on the detected gain imbalance.

6. A method of claim 5, wherein in the step b), the gain imbalance is detected by calculating a difference value between an absolute value of the gain-controlled signal and an absolute value of the remaining channel signal, and multiplying the difference value and a loop gain to generate the gain imbalance.

7. The method of claim 5, wherein in the step c) the remaining channel signal is compensated based on the gain-controlled signal by multiplying the detected imbalance gain by the remaining channel signal.

8. The method of claim 5, wherein the selected channel signal is an I-channel signal and the remaining channel signal is an Q-channel signal.

9. A computer readable recording medium for storing instructions for executing a method for compensating a gain imbalance between an I-channel signal and a Q-channel signal, the method comprising the steps of:
   a) controlling a gain of a signal selected from the I-channel signal and the Q-channel signal to have a predetermined amplitude, thereby generating a gain-controlled signal;
   b) detecting a gain imbalance between the gain-controlled signal and a remaining channel signal, wherein the gain imbalance is detected by calculating a difference value between an absolute value of the gain-controlled signal and an absolute value of the remaining channel signal, and multiplying the difference value and a loop gain to generate the gain imbalance; and
   c) compensating the gain imbalance of the remaining channel signal based on the detected gain imbalance.

\* \* \* \* \*